Jan. 2, 1934. D. S. JACOBUS 1,942,170
FLUID HEATING APPARATUS
Filed July 30, 1932  3 Sheets-Sheet 3
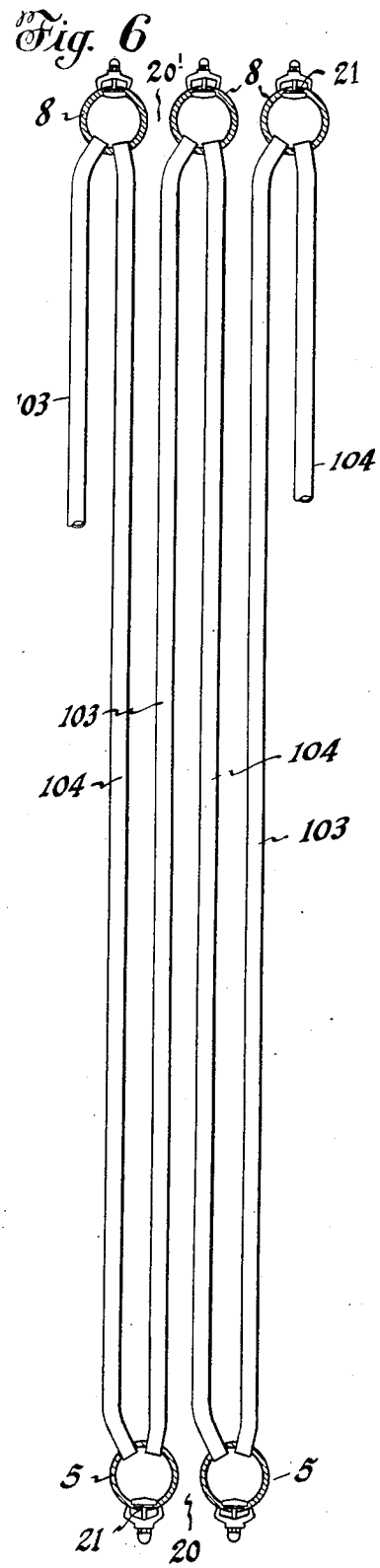
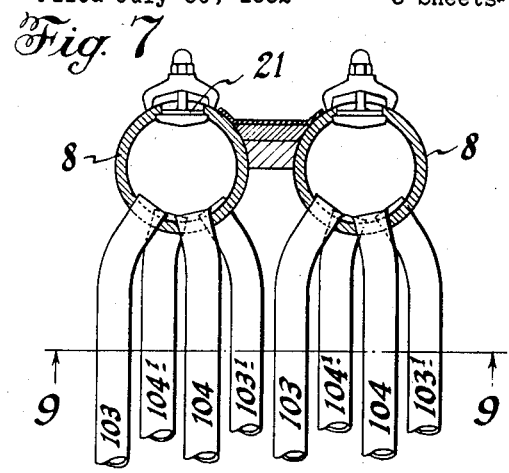
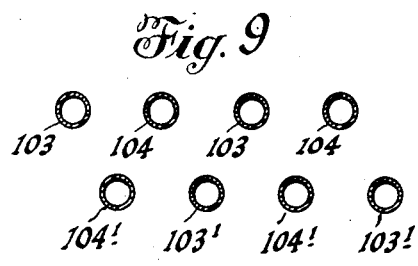
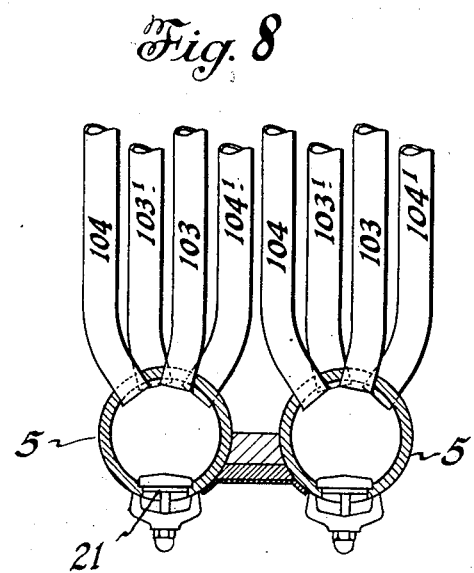
INVENTOR
David S. Jacobus
BY
Benj R. Newcomb
ATTORNEY Patented Jan. 2, 1934

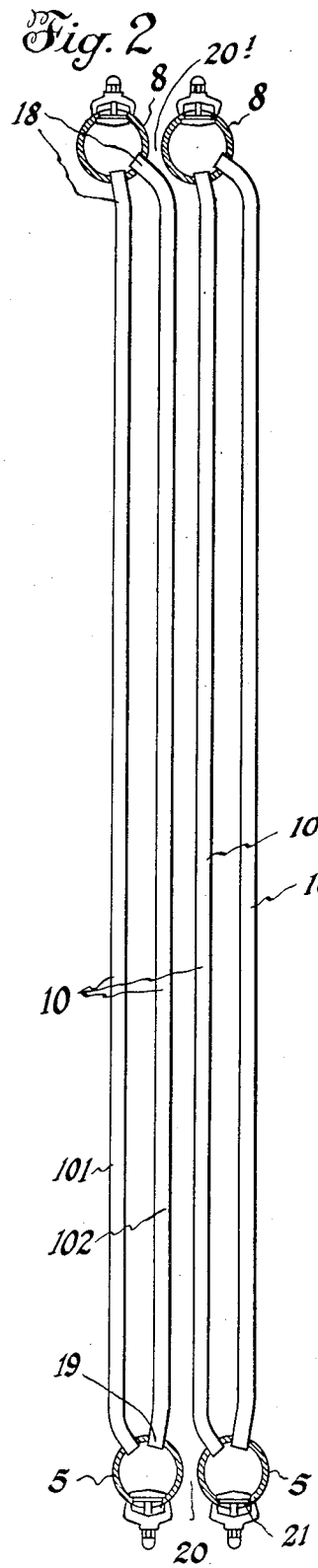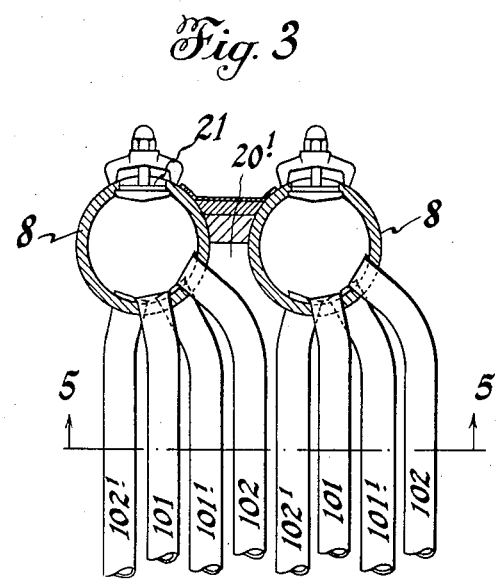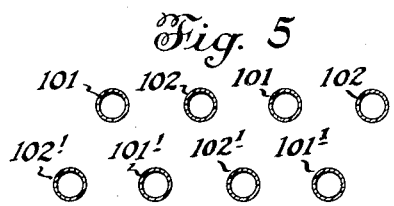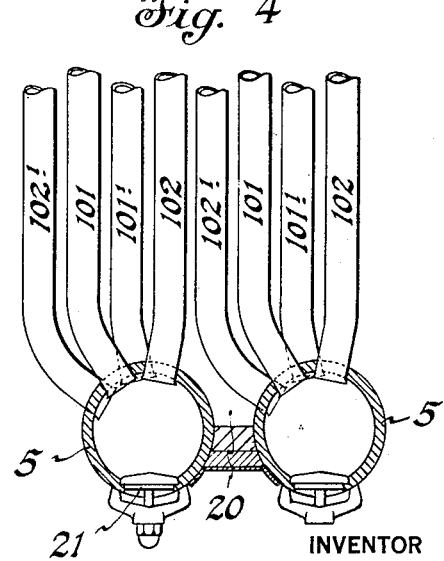

1,942,170

UNITED STATES PATENT OFFICE 1,942,170

FLUID HEATING APPARATUS

David S. Jacobus, Montclair, N. J., assignor to The Babcock & Wilcox Company, Bayonne, N. J., a corporation of New Jersey Application July 30, 1932. Serial No. 626,704

15 Claims. (Cl. 122—265)

My present invention relates to the construction of fluid heating apparatus embodying spaced headers connected by tubular fluid conduit elements.

The general object of my invention is the provision of fluid heating apparatus embodying spaced headers connected by tubular fluid conduit elements with an improved construction and arrangement of the headers and tubes, providing a highly effective arrangement of the heat transfer surface and facilitating the replacement of the tubes. A more specific object is the provision of a high pressure steam boiler of the water tube type with a header and tube arrangement of the character described.

The various features of novelty which characterized my invention are pointed out with particularity in the claims annexed to and forming a part of this specification. For a better understanding of the invention, its operating advantages and specific objects attained by its use, reference should be had to the accompanying drawings and descriptive matter in which I have illustrated and described preferred embodiments of my invention.

Of the drawings,

Fig. 2 is a partial section on the line 2—2 of Fig. 1, showing the arrangement of tubes with respect to their headers in one row;

Fig. 3 is a fragmentary section on the same surface as Fig. 2, but on an enlarged scale, showing the relation of tubes in adjacent rows at the uptake end of Figs. 1 and 2;

Fig. 4 is a view similar to Fig. 3, but showing the arrangement of tubes and headers at the downtake end of Figs. 1 and 2;

Fig. 5 is a section on the line 5—5 of Fig. 3;

Fig. 6 is a view similar to Fig. 2, of a different embodiment of the invention;

Figure 1:
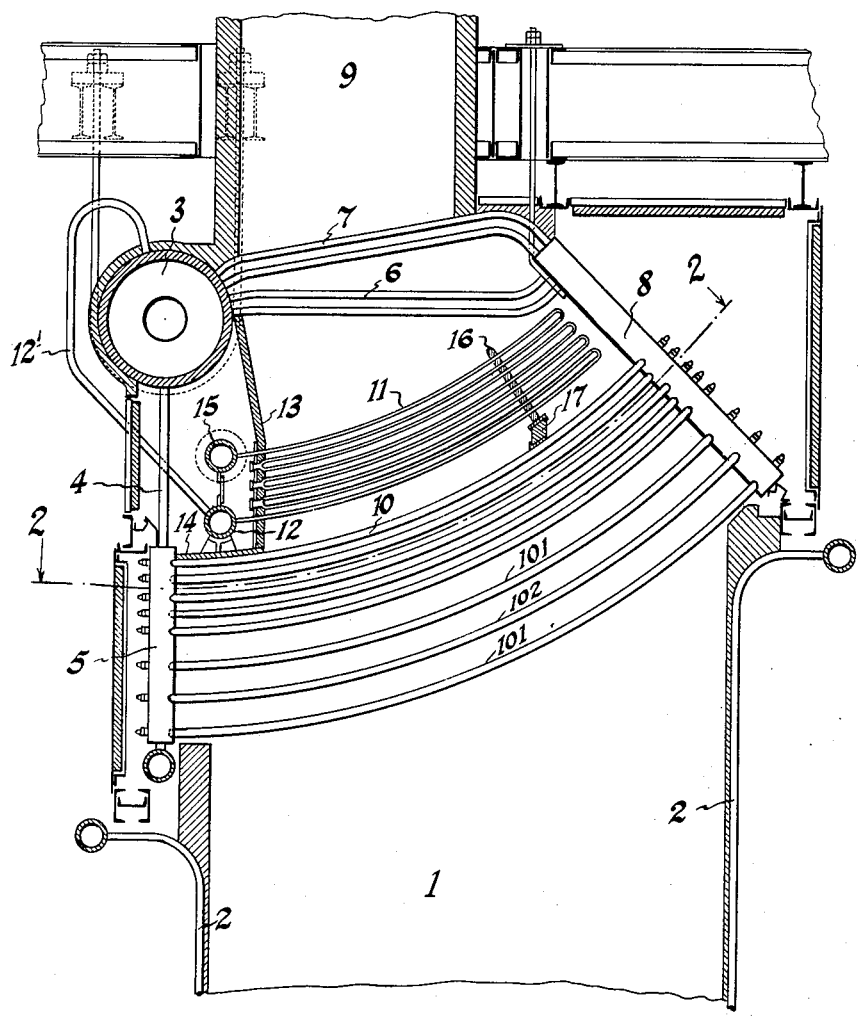
Fig. 1 is a vertical sectional view through the upper part of a furnace and a boiler associated therewith.

Figs. 7, 8 and 9 are views corresponding to Figs. 3, 4 and 5, and bearing the same relation to Fig. 6 as Figs. 3, 4 and 5 bear to Fig. 2.

The invention is illustrated as embodied in a steam boiler of the water tube type comprising a combustion chamber 1, in which fuel is burned to form a source of heat. While the fuel burning apparatus is not shown, it may be of any suitable type, the invention being particularly adapted for use with steam boilers utilizing pulverized coal or other slag forming fuel. The walls of the chamber are advantageously provided with rows of water tubes 2, in which steam is generated, and conducted into the circulating system of the boiler by suitable connections (not shown).

Disposed above the combustion chamber is the boiler proper, which comprises a transversely arranged steam and water drum 3 connected by nipples 4 to downtake headers 5, and by circulators 6 and 7 to uptake headers 8. The headers 5 and 8 are arranged at opposite ends of the boiler with the headers at each end having their axes disposed substantially in a single plane. As shown in Fig. 1, the downtake headers are vertical, while the uptake headers are at a higher level in the boiler and inclined at an angle of approximately 45° towards the downtake headers. The rows of headers aid in defining opposite walls of a tapering gas pass through which flow heating gases from the combustion chamber 1 to the outlet flue 9. The headers 5 and 8 are preferably straight headers of circular cross-section arranged as hereinafter described. The rows of uptake and downtake headers are connected by a bank of steam generating tubes 10, arranged in rows across the width of the boiler, with the tubes in each row for a major portion of their lengths concentrically curved relative to the tubes in the remaining rows. The ends of each tube are bent in a predetermined manner and expanded into certain headers, as hereinafter described.

Supported on the topmost row of tubes 10 in the bank is a superheater 11 having its inlet header 12 supplied with steam from the drum 3 through the connections 12'. The superheater may be supported at one end by a wall 13 resting on the topmost row of tubes 10, the space between the bottom of this wall and the headers 5 being sealed by means of a baffle 14, and this baffle may be used as a convenient support for the headers 12 and 15 of the superheater. Near the other end of the superheater may be disposed a second wall 16 to support the superheater, this wall resting upon blocks 17 supported on the tubes 10.

In accordance with my invention, the tubes 10 and headers 5 and 8 are so relatively arranged that when assembled a highly effective arrangement of the heat transfer surface is provided, in which the tubes in each row for a major portion of their lengths are substantially uniformly spaced apart, providing gas passages across the width of the boiler of substantially uniform width, and which relative arrangement facilitates the replacement of any of the tubes.

In the form shown in Figs. 2–5, the headers in each row are spaced apart a distance greater than the tube outside diameter with the headers in one row offset with respect to the headers in the other row, i. e., a vertical plane including the axis of a header in one row and disposed parallel to the major portion of one of the tubes connected thereto will not pass through the axis of a header in the other row. In this form, the headers at opposite ends of each tube are offset a distance equal to one-half the spacing between the header axes in each row, so that a vertical plane containing a header axis and arranged as described will pass through the space between adjacent headers in the other row.

The tubes 10 are arranged in pairs spaced longitudinally of the headers, each tube being continuously curved for a major portion of its length and with its ends bent out of the plane of curvature of the major portion of the tube sufficiently to provide a substantially uniform spacing of all of the tubes in that row across the boiler and a staggering of the tubes in rows spaced longitudinally of the header. In this embodiment, the tubes 101 and 102 in each pair are connected at each end to the same header and bent more at one end than at the other, the bending in each case being enough to cause substantially radial entrance of the tube into the header for a slightly greater portion of its length than the tube 102 of the pair. The tube 101 has its ends bent in opposite directions, whereas the tube 102 has its ends bent in the same direction, but in both instances the amount of bend is different at one end from what it is at the other. This arrangement of tubes thus bent, in combination with the offset arrangement of headers, greatly facilitates the removal and replacement of a tube. For example, referring to the tube 102, if this tube is to be removed, it is first cut loose at both ends 18 and 19 and then moved in a horizontal plane laterally until the end 19 is opposite the space 20 between the headers 5. The tube is then pulled through the space 20. Due to the header arrangement, the desired tube spacing can be obtained while keeping the amount of bend in one end of the tube sufficiently small to permit this bent end to be passed between the headers at that end of the boiler. The minimum clearance between headers is, of course, slightly greater than the outside diameter of a tube, and this minimum must be somewhat increased when the end of the tube is bent. The tube 101 may be removed through the space 20' between adjacent headers 8 by movements opposite to those mentioned in connection with the tube 102.

In replacing the tube 102, for example, a new tube with its uptake end foremost is inserted through the interheader space 20 until the end 18 approaches the headers 8. The tube is then swung over horizontally and inserted in the proper tube opening of the header 8 to the left of the tube, as seen in Fig. 2. The tube is pushed into the header 8 a sufficient distance to allow the tube end 19 to clear the corresponding header 5. The tube is then swung horizontally until the end 19 is in line with its tube opening in the header 5. The tube is then moved axially until both ends are in the proper position for expanding. The tube 101 may be replaced by substantially similar manipulations from the opposite end of the boiler.

In the adjoining rows of tubes, tubes designated 101' and 102' have end portions bent similar to those of the tubes designated 101 and 102, respectively, but are turned end for end, so as to provide the staggered relation shown in Figs. 3-5. The tubes 101' are removed and replaced in a manner similar to that described for the tubes 102, while the tubes 102' are removed and replaced from the same end of the boiler as the tubes 101. The hand hole openings 21 may be employed for the removal and replacement of the tubes 101 and 101' where it is more convenient to do so than to manipulate the tubes between the headers. The spacing between the major portions of the tubes in each pair is preferably greater than the outside diameter of a tube, so that a certain amount of radiant heat from the combustion chamber may pass between the tubes and strike the superposed superheater tubes. The exposure of the superheater surface to both radiant and convection heat advantageously minimizes the change in the degree of superheat effected with changes in the amount of fuel burned in the combustion chamber.

A suitable slag screen is formed in the lower portion of the tube bank by omitting the rows of tubes 101', 102', and alternately the tubes 101 and 102. The lower rows of tubes will thus be staggered and spaced apart twice as far as the upper rows of the bank.

In Figs. 6 to 9, inclusive, is shown a different embodiment of the invention in which the tubes in each pair are connected at one end to the same header and to adjacent headers at the other end. As shown in Fig. 6, the larger bent end of the tube 104 and the smaller bent end of the tube 103 are connected to the same downtake header, while the smaller bent end of the same tube 104 and the larger bent end of the same tube 103 are connected to different uptake headers. The tubes 103' and 104' forming the adjacent rows are staggered for a major portion of their lengths with respect to the tubes 103 and 104. Advantageously, the tubes 103 and 104' have similarly bent end portions, but are turned end for end; a similar relation exists between the tubes 104 and 103'. In this construction, the tubes 104 and 104' are adapted for removal and replacement through the spaces 20' between the uptake headers, while the tubes 103 and 103' are manipulated through the spaces 20 between the downtake headers. The arrangement is otherwise similar to that shown in Figs. 2-5.

While in accordance with the provisions of the statutes I have illustrated and described herein the best forms of my invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. Fluid heating apparatus comprising spaced rows of straight headers, the longitudinal axes of the headers in each row being disposed substantially in a single plane and the headers in each row being spaced apart a distance equal to at least a tube diameter and offset with respect to the headers in the other row, a bank of fluid conduit tubes connecting said rows of headers, said tubes being arranged in rows extending longitudinally of said headers, all of the tubes in each row being spaced apart substantially uniformly for a major portion of their lengths, and each of said tubes having bent end portions and being arranged for removal through an inter-header space at one end thereof.

2. Fluid heating apparatus comprising spaced rows of straight headers of substantially circular cross-section, the longitudinal axes of the headers in each row being disposed substantially in a single plane and the headers in each row being spaced apart a distance equal to at least a tube diameter and offset with respect to the headers in the other row, a bank of continuously curved fluid conduit tubes connecting said rows of headers, said tubes being arranged in rows extending longitudinally of said headers, all of the tubes in each row being spaced apart substantially uniformly for a major portion of their lengths, and each of said tubes having bent end portions and being arranged for removal through an inter-header space at one end thereof.

3. Fluid heating apparatus comprising spaced rows of straight headers of substantially circular cross-section, the longitudinal axes of the headers in each row being disposed substantially in a single plane and the headers in each row being spaced apart a distance equal to at least a tube diameter and offset with respect to the headers in the other row, a bank of concentrically curved fluid conduit tubes connecting said rows of headers, said tubes being arranged in rows extending longitudinally of said headers, all of the tubes in each row being spaced apart substantially uniformly for a major portion of their lengths, and each of said tubes having bent end portions and being arranged for removal through an inter-header space at one end thereof.

4. Fluid heating apparatus comprising spaced rows of straight headers of substantially circular cross-section, the longitudinal axes of the headers in each row being disposed substantially in a single plane and the headers in each row being spaced apart a distance equal to at least a tube diameter and offset with respect to the headers in the other row, a bank of concentrically curved fluid conduit tubes connecting said rows of headers, said tubes being arranged in rows extending longitudinally of said header, all of the tubes in each row being spaced apart substantially uniformly for a major portion of their lengths, and each of said tubes having bent end portions with one end being bent more than the other, and being arranged for removal through an inter-header space at its lesser bent end.

5. A water tube steam boiler comprising a combustion chamber, spaced rows of straight headers arranged to define opposite sides of a pass for heating gases leaving said combustion chamber, the longitudinal axes of the headers in each row being disposed substantially in a single plane, the headers in each row being spaced apart a distance equal to at least a tube diameter and offset with respect to the headers in the other row, a bank of tubes arranged in rows extending across said gas pass and having ends connected to said rows of headers, the tubes in each tube row being substantially uniformly spaced apart for a major portion of their lengths, and each tube having bent end portions with one end bent more than the other, and adjacent tubes in each row being arranged for removal through inter-header spaces at opposite sides of said gas pass.

6. A water tube steam boiler comprising a combustion chamber, spaced rows of straight headers arranged to define opposite sides of a pass for heating gases leaving said combustion chamber, the longitudinal axes of the headers in each row being disposed substantially in a single plane, the headers in each row being spaced apart a distance equal to at least a tube diameter and offset with respect to the headers in the other row, a bank of continuously curved tubes arranged in rows extending across said gas pass and having ends connected to said rows of headers, the tubes in each tube row being substantially uniformly spaced apart for a major portion of their lengths, and adjacent tubes in each row being arranged for removal through inter-header spaces at opposite sides of said gas pass.

7. A water tube steam boiler comprising a combustion chamber, spaced rows of straight headers of substantially circular cross-section arranged to define opposite sides of a pass for heating gases leaving said combustion chamber, the headers in each row being spaced apart a distance equal to at least a tube diameter and offset with respect to the headers in the other row, a bank of continuously curved tubes arranged in rows extending across said gas pass and having bent ends radially connected to said headers, and the tubes in each tube row being substantially uniformly spaced apart for a major portion of their lengths and arranged for removal through an inter-header space at one side of said gas pass.

8. A water tube steam boiler comprising a combustion chamber, spaced rows of straight headers of substantially circular cross-section arranged to define opposite sides of a tapering pass for heating gases leaving said combustion chamber, the longitudinal axes of the headers in each row being disposed substantially in a single plane, the headers in each row being spaced apart a distance equal to at least a tube diameter and offset with respect to the headers in the other row, a bank of concentrically curved tubes arranged in rows extending across said gas pass and having bent ends connected to said rows of headers, and the tubes in each tube row being substantially uniformly spaced apart for a major portion of their lengths, and adjacent tubes in each row being arranged for removal through interheader spaces at opposite sides of said gas pass.

9. A water tube steam boiler comprising a combustion chamber, spaced rows of straight headers of substantially circular cross-section arranged to define opposite sides of a pass for heating gases leaving said combustion chamber, the longitudinal axes of the headers in each row being disposed substantially in a single plane and the headers in each row being spaced apart a distance equal to at least a tube diameter and offset with respect to the headers in the other row, an inclined bank of tubes arranged in staggered rows extending across said gas pass, the tubes connected to each header being arranged in pairs spaced apart longitudinally of said header, the tubes in each tube row being substantially uniformly spaced apart for a major portion of their lengths, and the tubes forming each pair being arranged for removal through inter-header spaces at the sides of said gas pass.

10. A water tube steam boiler comprising a combustion chamber, spaced rows of straight headers of substantially circular cross-section arranged at an angle to one another to define opposite sides of a tapering pass for heating gases leaving said combustion chamber, the longitudinal axes of the headers in each row being disposed substantially in a single plane, the headers in each row being spaced apart a distance equal to at least a tube diameter and offset with respect to the headers in the other row, an inclined bank of tubes arranged in staggered rows extending across said gas pass, the tubes connected to each header being arranged in pairs equally spaced apart longitudinally of said header and said tubes having end portions bent out of alignment with the major portion thereof, the tubes in each tube row being substantially uniformly spaced apart for a major portion of their lengths, and the tubes forming each pair being arranged for removal through inter-header spaces at the sides of said gas pass.

11. A water tube steam boiler comprising a combustion chamber, spaced rows of straight headers of substantially circular cross-section arranged to define opposite sides of a pass for heating gases leaving said combustion chamber, the longitudinal axes of the headers in each row being disposed substantially in a single plane, the headers in each row being spaced apart a distance equal to at least a tube diameter and offset with respect to the headers in the other row, a bank of continuously curved tubes arranged in rows extending across said gas pass, the tubes connected to each header being arranged in pairs spaced apart longitudinally of said header with the tubes in adjacent pairs being similar in form but turned end for end, and the similar tubes in adjacent rows being arranged for removal through inter-header spaces at opposite sides of said gas pass.

12. A water tube steam boiler comprising a combustion chamber, spaced rows of straight headers of substantially circular cross-section arranged to define opposite sides of a pass for heating gases leaving said combustion chamber, the longitudinal axes of the headers in each row being disposed substantially in a single plane, the headers in each row being spaced apart a distance equal to at least a tube diameter and offset with respect to the headers in the other row, a bank of continuously curved tubes arranged in rows extending across said gas pass, the tubes connected to each header being arranged in pairs spaced apart longitudinally of said header with the tubes in adjacent pairs being similar in form but turned end for end, the tubes in each tube row being substantially uniformly spaced apart for a major portion of their lengths, and the tubes forming each pair being arranged for removal through inter-header spaces at opposite sides of said gas pass.

13. A water tube steam boiler comprising a combustion chamber, spaced rows of straight headers of substantially circular cross-section arranged to define opposite sides of a pass for heating gases leaving said combustion chamber, the longitudinal axes of the headers in each row being disposed substantially in a single plane, the headers in each row being spaced apart a distance equal to at least a tube diameter and offset with respect to the headers in the other row, a bank of concentrically curved tubes arranged in rows extending across said gas pass, the tubes connected to each header being arranged in pairs spaced apart longitudinally of said header with the tubes in adjacent pairs being similar in form but turned end for end, the tubes in each tube row being substantially uniformly spaced apart for a major portion of their lengths, and the tubes forming each pair being arranged for removal through inter-header spaces at opposite sides of said gas pass.

14. A water tube steam boiler comprising a combustion chamber, spaced rows of straight headers of substantially circular cross-section arranged to define opposite sides of a pass for heating gases leaving said combustion chamber, the longitudinal axes of the headers in each row being disposed substantially in a single plane, the headers in each row being spaced apart a distance equal to at least a tube diameter and offset with respect to the headers in the other row, a bank of continuously curved tubes arranged in rows extending across said gas pass, the tubes connected to each header being arranged in pairs spaced apart longitudinally of said header and having their other ends oppositely bent laterally relative to one another and connected to a pair of adjacent headers at the opposite side of said gas pass, the tubes in each tube row being substantially uniformly spaced apart for a major portion of their lengths, and the tubes forming each pair being arranged for removal through inter-header spaces at the sides of said gas pass.

15. A water tube steam boiler comprising a combustion chamber, spaced rows of straight headers of substantially circular cross-section arranged to define opposite sides of a tapering pass for heating gases leaving said combustion chamber, the longitudinal axes of the headers in each row being disposed substantially in a single plane, the headers in each row being spaced apart a distance equal to at least a tube diameter and offset with respect to the headers in the other row, a bank of concentrically curved tubes arranged in staggered rows extending across said gas pass, the tubes connected to each header being arranged in pairs spaced apart longitudinally of said header with the tubes in certain adjacent pairs being similar in form but turned end for end, the tube pairs nearer the combustion chamber being spaced apart longitudinally of said headers a greater distance than the pairs more remote from said chamber, each tube having end portions bent laterally to different amounts, the tubes in each tube row being substantially uniformly spaced apart for a major portion of their lengths, and the tubes forming each pair being arranged for removal through inter-header spaces at opposite sides of said gas pass.

DAVID S. JACOBUS.

CERTIFICATE OF CORRECTION.

Patent No. 1,942,170.　　　　　　　　　　　　　　　　January 2, 1934.

DAVID S. JACOBUS.

It is hereby certified that error appears in the printed specification of the above numbered patent requiring correction as follows: Page 2, lines 29 and 30, strike out the words "for a slightly greater portion of its length than the tube 102 of the pair"; and that the said Letters Patent should be read with this correction therein that the same may conform to the record of the case in the Patent Office.

Signed and sealed this 11th day of September, A. D. 1934.

Leslie Frazer (Seal)　　　　　　　　　　　　　　　　　　　　Acting Commissioner of Patents.